(12) United States Patent
Grice et al.

(10) Patent No.: US 10,175,554 B2
(45) Date of Patent: Jan. 8, 2019

(54) DETERMINISTIC SINGLE-PHOTON SOURCE BASED ON SPECTRAL SHIFT OF A HERALDED PHOTON

(71) Applicant: UT-Battelle, LLC, Oak Ridge, TN (US)

(72) Inventors: Warren P. Grice, Oak Ridge, TN (US); Joseph M. Lukens, Knoxville, TN (US); Nicholas A. Peters, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 15/829,349

(22) Filed: Dec. 1, 2017

(65) Prior Publication Data

US 2018/0231868 A1 Aug. 16, 2018

Related U.S. Application Data

(60) Provisional application No. 62/458,182, filed on Feb. 13, 2017.

(51) Int. Cl.
*G02F 1/35* (2006.01)
*G02F 1/365* (2006.01)
*H04B 10/70* (2013.01)

(52) U.S. Cl.
CPC .............. *G02F 1/3501* (2013.01); *G02F 1/35* (2013.01); *G02F 1/3526* (2013.01); *G02F 1/3536* (2013.01); *G02F 1/365* (2013.01); *H04B 10/70* (2013.01); *G02F 1/3532* (2013.01); *G02F 2001/3503* (2013.01);
(Continued)

(58) Field of Classification Search
CPC ..... G02F 2001/3503; G02F 2001/3507; G02F 2202/32; G02F 2203/05; G02F 1/3501
See application file for complete search history.

(56) References Cited

U.S. PATENT DOCUMENTS 7,304,788 B2 * 12/2007 McKinstrie ........... G02F 1/3536
359/326
7,570,365 B2 * 8/2009 Trifonov ................. G02F 1/395
356/480
(Continued)

FOREIGN PATENT DOCUMENTS

CN 103901700 A 7/2014
GB 2542189 A 3/2017

OTHER PUBLICATIONS

Kok et al., "Linear Optical Quantum Computing with Photonic Qubits," *Reviews of Modern Physics*, vol. 79, Jan.-Mar. 2007, 40 pages.
(Continued)

*Primary Examiner* — Rhonda S Peace
(74) *Attorney, Agent, or Firm* — Klarquist Sparkman, LLP (57) ABSTRACT

An apparatus for producing a single photon can comprise a modulator that modulates the wavelength of a pump beam based on wavelength of an idler photon of a signal/idler photon pair. A wavelength division multiplexer combines the modulated pump beam and the signal photon in a non-linear element to produce an output photon having a preselected wavelength based on signal photon wavelength and a wavelength of the modulated pump beam.

16 Claims, 8 Drawing Sheets

(52) U.S. Cl.
CPC .. *G02F 2001/3507* (2013.01); *G02F 2202/32* (2013.01); *G02F 2203/05* (2013.01)

(56) References Cited

U.S. PATENT DOCUMENTS

| | | | | |
|---|---|---|---|---|
| 7,760,970 | B2* | 7/2010 | Baehr-Jones | G02F 1/3515 385/10 |
| 8,242,435 | B2* | 8/2012 | Arahira | G02F 1/39 250/251 |
| 8,536,508 | B2* | 9/2013 | Peters | H04L 9/0855 250/214 R |
| 8,676,063 | B2* | 3/2014 | Arahira | H04B 10/70 398/182 |
| 9,100,131 | B2* | 8/2015 | Madey | H04B 10/70 |
| 9,465,274 | B1* | 10/2016 | Soh | G02F 1/3536 |
| 9,488,897 | B2* | 11/2016 | Oshima | H01S 5/30 |
| 9,671,672 | B1* | 6/2017 | Gammon | G02F 1/3556 |
| 9,798,219 | B2 | 10/2017 | Pant | G02F 1/31 |
| 2012/0051740 | A1* | 3/2012 | Arahira | H04B 10/70 398/28 |
| 2017/0075190 | A1* | 3/2017 | Rudolph | G02F 1/3526 |
| 2017/0212405 | A1* | 7/2017 | Pant | G02F 1/31 |

OTHER PUBLICATIONS

Joshi et al., "Frequency Multiplexing for Deterministic Heralded Single-Photon Sources," *Conference on Laser and Electro-Optics, OSA Technical Digest* (online) (Optical Society of America, Jun. 5-10, 2016), paper FTh1C.2., 28 pages.

Pittman et al., "Single photons on pseudo-demand from stored parametric downconversion," *Phys. Rev. A* 66:042303, 8 pages (2002).

Jeffrey et al., "Towards a periodic deterministic source of arbitrary single-photon states," *New Journal of Physics* 6, 100, 15 pages (2004).

Migdall et al., "Tailoring single-photon and multiphoton probabilities of a single-photon on-demand source," *Phys. Rev. A* 66, 053805, 4 pages (2002).

Knill et al., "A scheme for efficient quantum computation with linear optics," *Nature*, vol. 409, pp. 46-52 (2001).

Betourné et al., "Design of a photonic crystal fiber for phase-matched frequency doubling or tripling," *Optics Express* vol. 16, No. 18, pp. 14255-14262 (2008).

Levine et al., "Heralded, pure-state single-photon source based on a potassium titanyl phosphate waveguide," *Optics Express* vol. 18, No. 4, pp. 3708-3718 (2010).

Puigbert et al., "Heralded single photons based on spectral multiplexing and feed-forward control," *Phys. Rev. Lett.* 119, 083601, 6 pages (Aug. 2017).

Shapiro and Wong, "On-demand single-photon generation using a modular array of parametric downconvertors with electro-optic polarization controls," *Optics Letters* vol. 32, No. 18, pp. 2698-2700 (2007).

International Search Report and Written Opinion dated Mar. 2, 2018 (dated Mar. 12, 2018), issued by the European Patent Office in Patent Cooperation Treaty Application No. PCT/US2017/0164142, filed Dec. 1, 2017.

* cited by examiner

DETERMINISTIC SINGLE-PHOTON SOURCE BASED ON SPECTRAL SHIFT OF A HERALDED PHOTON

CROSS REFERENCE TO RELATED APPLICATION

This application claims the benefit of U.S. Provisional Application 64/458,182, filed Feb. 13, 2017, which is hereby incorporated by reference in its entirety.

ACKNOWLEDGMENT OF GOVERNMENT SUPPORT

This invention was made with government support under Contract No. DE-AC05-000R22725 awarded by the U.S. Department of Energy. The government has certain rights in the invention.

FIELD

The disclosure relates to single-photon sources and specifically to deterministic single-photon sources based on spectral shifts of heralded photons.

BACKGROUND

The emerging field of quantum information has applications in communication, sensing, metrology, cryptography, and computing among others. However, these applications often require the on-demand generation of a single photon having a given frequency and polarization. For many quantum information applications, it is necessary to generate a single photon with a given wavelength that can arrive at a particular location at a particular time. This requires a source that can generate a single photon of a given wavelength on demand.

Some approaches for generating single photons are described in Pittman et al., "Single photons on pseudo-demand from stored parametric downconversion," Phys. Rev. A 66:042303 (2002), Kok et al., "Linear optical quantum computing with photonic qubits," Rev. Mod. Phys. 79, 135 (2007), Joshi et al., "Frequency multiplexing for quasi-deterministic heralded single-photon sources," arXiv:1707.00048 (2017), Jeffrey et al., "Towards a periodic deterministic source of arbitrary single-photon states," New Journal of Physics 6, 100 (2004), and Migdall et al., "Tailoring single-photon and multiphoton probabilities of a single-photon on-demand source," Phys. Rev. A 66:053805 (2002). Some approaches use switches that select an optical path associated with a selected output photon frequency. Unfortunately, switches can be lossy, and the signal photon can be absorbed or otherwise lost due to the switch (or other components) and thus no suitable output photon becomes available. In addition to their unreliability in producing a desired photon on demand, systems using multiple optical paths and multiple pump sources (such as described in Joshi) tend to be complex and expensive. Accordingly, improved approaches are needed.

SUMMARY

Systems, methods, and apparatus that can provide deterministic single photons based on spectral shifts of a heralded photon are disclosed herein. In one representative embodiment, an apparatus comprises a secondary laser configured to produce a secondary pump beam and a modulator situated to receive the secondary pump beam and modulate the secondary pump beam at a frequency based on a wavelength of a first photon of a pair of correlated photons. The apparatus can include a beam combiner situated to combine the second photon of the pair of correlated photons and the modulated secondary pump beam. In some examples, a secondary non-linear optical element (NLE) is configured to receive the second photon of the pair of correlated photons and the modulated secondary pump beam from the beam combiner and produce an output photon having a wavelength based on wavelengths of the second photon and the modulated secondary pump beam. In some alternatives, the modulator is an electro-optic modulator, the beam combiner is a wavelength division multiplexer, and the secondary NLE is a photonic-crystal fiber. In some embodiments, an optical filter is situated to separate the output photon from the modulated secondary pump beam.

In additional representative examples, a primary pump laser is configured to produce a primary pump beam, wherein the pair of correlated photons is produced in response to the primary pump beam. In some examples, the primary pump laser and the secondary pump laser are a common pump laser, and the primary pump beam and the secondary pump beam are provided by a common pump beam. In still further examples, a primary non-linear optical element (NLE) is situated to receive the primary pump beam and produce the pair of correlated photons. In a particular example, the primary NLE and the secondary NLE are defined by a common NLE.

In additional examples, a beam separator is situated to receive the correlated photons and direct the second photon to the secondary NLE and the first photon to a detector so as to determine the wavelength of the second photon. In typical examples, the detector includes a spectral disperser and a plurality of photon detectors, wherein each of the photon detectors is coupled to the spectral disperser so as to be associated with a respective wavelength range so that the wavelength of the first photon of the pair of correlated photons is determined based on detection by a selected photon detector of the plurality of photon detectors. In some cases, a beam separator is situated to receive the correlated photons and direct the second photon to the secondary NLE and the first photon to a detector so as to determine the wavelength of the second photon, wherein the beam separator provides a plurality of beam separator outputs, each associated with a respective wavelength range. In a representative example, the detector includes a plurality of photon detectors, wherein each of the photon detectors is coupled to the beam separator so as to be associated with a respective wavelength range so that the wavelength of the first photon of the pair of correlated photons is determined based on detection by a selected photon detector of the plurality of photon detectors. In some examples, one or both of the beam separator and the beam combiner are wavelength division multiplexers or dichroic beamsplitters. A modulator controller is coupled to the detector and responsive to detection of the first photon to control the modulation applied by the modulator in response to the wavelength of the first photon.

In some examples, an optical delay is positioned between the beam separator separating the first photon and the second photon and the beam combiner that combines the second photon and the secondary pump beam. In some cases, the modulation is selected to produce an output photon wavelength as the wavelength of the primary pump beam.

According to representative examples, methods comprise receiving a first photon and a second photon, wherein the second photon is correlated to the first photon, and measuring a wavelength of the second photon and applying a modulation based on the measured wavelength to produce an output photon. In some examples, the modulation is applied to a secondary pump beam and the output photon is produced by combining the first photon and the modulated secondary pump beam in a first non-linear optical element. In representative embodiments, the first photon and the modulated secondary pump beam are combined with a wavelength division multiplexer and are directed to the non-linear optical element. In some cases, an output beam produced by the non-linear optical element is filtered to selectively attenuate output beam portions at wavelengths outside of a wavelength range associated with the output photon. In representative examples, the wavelength of the second photon is measured by directing the second photon to a spectral disperser and detecting the second photon as received from the spectral disperser, wherein the spectral disperser applies a spatial dispersion or a temporal dispersion.

In representative methods, the second photon is detected by a photon detector situated with respect to the spectral disperser so as to be associated with a spectral range so that detection of the second photon by the photon detector indicates that the second photon wavelength is in the associated spectral range. In typical examples, the correlated photons are produced by directing a primary pump beam to a second non-linear optical element. In some cases, the primary pump beam and the secondary pump beam are portions of a common beam and the first non-linear optical element is the same as the second non-linear optical element. In some examples, at least one of the first non-linear optical element and the second non-linear optical element is a photonic crystal fiber and the modulation is applied with an electro-optic modulator or by modulating the secondary pump beam.

According to a representative embodiment, a deterministic photon source comprises a primary laser that produces a primary pump beam and a first photonic crystal fiber situated to receive the primary pump beam and produce a series of correlated photon pairs. A first wavelength division multiplexer (WDM) and a second WDM are situated so that the first WDM receives the correlated photon pairs and directs a first photon of each correlated photon pair to the second WDM. A plurality of photon detectors is coupled to a third WDM to receive the second photon of each correlated photon pair, wherein the photon detectors are situated so that each photon detector is associated with a respective wavelength range. A secondary pump laser is situated to direct a secondary pump beam to a phase modulator to apply a phase modulation in response to detection of a particular second photon at a particular photon detector. The phase modulation is thus associated with the wavelength range associated with the particular detector. A second photonic crystal fiber is situated to receive each of the first photons and the modulated secondary pump beam from the second WDM, and produce output photons corresponding to the detected first photons, with spectral shift based on secondary pump wavelength and modulation frequency.

The foregoing and other objects, features, and advantages of the disclosed technology will become more apparent from the following detailed description, which proceeds with reference to the accompanying figures.

DETAILED DESCRIPTION

Technical Overview

A laser beam, often called a pump beam, can be used to generate pairs of photons, by sending the pump beam through a non-linear optical material. Because of conservation of energy, the spectral properties of the pump beam, and the phase-matching conditions of the non-linear optical material, the wavelengths of these two generated photons will have a known relationship. Therefore, detecting the presence of one of the photons "heralds" the existence of the other in a particular spectral mode. Measuring the wavelength of one of the photons permits determination of the spectral properties of the other photon without direct measurement. The wavelength of the heralded photon can then be shifted to a desired wavelength. As disclosed herein, the phase-matching conditions of the non-linear optical material can include the influence of features meant to shape the spectral properties of the non-linear process, for example, placement of the non-linear material inside of a resonant cavity to enhance emission at particular wavelengths. The photon pair can be generated from a pump beam through spontaneous parametric down-conversion in which the pump beam is directed to a non-linear crystal, which produces two correlated photons (historically called a signal photon and an idler photon) from a single pump photon. The photon pair can also be generated from a pump beam through spontaneous four-wave mixing in which the pump beam is directed to a non-linear material that produces two correlated photons from two pump photons. The combined energies of the signal and idler photons must equal the energy of the pump photon or photons. Therefore, if an idler photon is detected and the idler photon wavelength is measured, then an associated signal photon must be present having a wavelength based on the pump and idler photon energies as well as the spectral properties of the pump beam, the phase-matching properties of the non-linear material, and the spectral response of the idler photon detector (including any spectral filters preceding it). If pump beam power is too high, multiple photon pairs will be created; if the pump power is too low, it is possible that no photon pairs will be created. Therefore, when using a photon source based on a single pair of frequencies, there is no pump power that can produce one and only one photon pair on-demand without adding noise from the generation of multiple photon pairs. However, with a spectrally multiplexed source as described herein, the single-pair and multiple-pair probabilities can be controlled independently, thus making it possible to obtain a single photon deterministically. That is, it is possible to pump the non-linear process such that the overall probability of photon-pair generation is unity, while the probability of generating multiple pairs of photons in any given spectral mode is quite small.

General Considerations

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

As used herein, operations that occur "simultaneously" or "concurrently" occur generally at the same time as one another, although delays in the occurrence of one operation relative to the other due to, for example, spacing, are expressly within the scope of the above terms, absent specific contrary language.

The terms beam and optical beam area used herein to refer to propagating electromagnetic radiation, typically in a wavelength range of between 100 nm and 10 µm. Such beams can propagate as guided modes or waves in an optical fiber, a planar waveguide, or other guided wave device. In most practical examples, such beams propagate in one or more modes associated with free space or guided wave propagation. In many cases, propagation in a single mode is preferred, and a lowest order mode is generally more convenient than other modes.

In some examples, non-linear optical processes are referred to as receiving a single photon from a pump beam and producing a photon pair as a result of three-wave mixing in a $\chi^{(2)}$ non-linearity that includes a "signal" photon and an "idler" photon. These terms are historically used for some non-linear optical processes, and either photon of the photon pair can be referred to as a signal or idler photon. In other examples, non-linear optical processes can receive two photons and produce a photon pair as a result of four-wave mixing in a $\chi^{(3)}$ non-linearity. In typical examples, a pump beam provides an input optical photon from which two or more photons can be produced in a non-linear process. For convenience, such a pump beam is also referred to as a primary pump beam. In typical examples, a photon from a primary pump beam is used to produce multiple photons, at least one of which is directed to a non-linear optical material to interact with another optical beam that is referred to herein as a secondary pump beam to produce a deterministic photon. In some cases, the primary and secondary pump beams are portions of a common beam from a single beam source such as a single laser, but these pump beams need not have a common wavelength, state of polarization, or be produced from a common beam source. In some examples, a single source is used as both a primary and secondary beam source. In typical examples, pump beams are provided with semiconductor lasers, solid state lasers, gas lasers, or other lasers. In addition, in some examples, polarization control of pump beams and/or signal photons is required, and one or more waveplates or polarizers can be used as needed, but polarization control devices are generally not shown to facilitate explanation. In particular, crystalline non-linear materials typically require specific states of polarization to produce superior results. As used herein, a heralded photon is a photon whose availability is detected, and a deterministic photon is a photon with known availability at a determined wavelength. In typical examples, the approaches disclosed herein produce a signal photon and an idler photon from one pump photon or from two pump photons. The signal (or idler) photon wavelength is measured, and the idler (or signal) photon and a modulated second pump beam are directed to an optical non-linear medium to produce a deterministic photon for output. The modulation of the second pump beam is selected so that a combination of the idler (or signal) photon and the modulated second pump beam produces single output photon at a desired frequency or wavelength. Suitable modulation can be determined based on the signal (or idler) wavelength measurement. The wavelength of the signal photon can be determined from the wavelength of the detected idler photon. The wavelength of the signal photon can then be shifted as disclosed herein to produce a single photon having a desired wavelength. In such examples, wavelengths of a primary pump photon, a signal photon, and an idler photon $\lambda_{pump}$, $\lambda_{signal}$, $\lambda_{idler}$, respectively, can be related as $$\frac{1}{\lambda_{pump}} = \frac{1}{\lambda_{signal}} + \frac{1}{\lambda_{idler}},$$

with similar relationships for non-linear processes that involve the interaction of additional beams/photons. For example, if two pump photons are used having wavelengths $\lambda_{pump1}$ and $\lambda_{pump2}$ to produce two output photons having wavelengths $\lambda_{output1}$ and $\lambda_{output2}$, the wavelengths can be related as $$\frac{1}{\lambda_{pump1}} + \frac{1}{\lambda_{pump2}} = \frac{1}{\lambda_{output1}} + \frac{1}{\lambda_{output2}}.$$

For examples in which a monochromatic beam is used for the pump beam, the above relationship yields a one-to-one relationship between the signal and idler wavelengths. For examples in which the pump beam includes multiple wavelengths (e.g., a broadband pulse), the above relationship still holds, but does not yield a one-to-one relationship between the signal and idler photons. In the most general case, the spectral properties of the photon pairs are determined by the spectral properties of the pump beam(s) and the phase-matching conditions of the non-linear material, including the influence of features meant to shape the spectral properties of the non-linear process, e.g., placement of the non-linear material inside a resonant cavity to enhance emission at particular wavelengths. Detection of an idler photon in a particular spectral mode indicates the presence of a signal photon with a known set of spectral properties. In the case of the one-to-one spectral correlation described in the above example, along with detection of a specific idler wavelength, the wavelength of the signal photon will be known with a high degree of certainty. More generally, the photons may not have a one-to-one wavelength correlation, and the idler detector may identify the idler wavelength only to within some range. In this case, the spectral properties of the signal photon are known to be within some range.

A selected output frequency is determined based on an input photon wavelength (signal photon, idler photon, or other correlated photon), applied modulation, and secondary pump wavelength. Generally, output photon frequency can be expressed as $v_{out} = v_{in} \pm m\, v_{pump2} \pm n\, v_{modulation}$, wherein $v_{out}$, $v_{in}$, $v_{pump2}$, and $v_{modulation}$ are output photon frequency, input photon frequency, secondary pump frequency, and modulation frequency, respectively, and m and n are integers. In some examples, output photon wavelength is the same as that of the input pump beam, but need not be. For other non-linear interactions, there can be additional or fewer terms contributing to this expression for output photon frequency.

The spectral properties of the output photon can be influenced by any of the following: the spectral properties of the primary pump beam, the phase-matching conditions of the nonlinear material, the influence of features meant to shape the spectral properties of the signal and idler photons, the spectral response of the idler detector, including any spectral filters, the spectral properties of the secondary pump beam, and the phase-matching conditions of the secondary non-linear material. Accordingly, any or all of these can be enlisted to achieve a particular output state.

The principles described herein are still applicable when the desired output state is not a single, specific wavelength. Accordingly, examples disclosed herein that describe producing a single photon of a given frequency can be modified to produce a single photon in a given spectral mode or a single photon within a given frequency range.

Non-linear media of various kinds can be used including gases, liquids, crystalline or isotropic non-linear materials having nonzero values of second or third (or higher) order non-linear polarizability. Examples include highly non-linear fibers such as narrow-core fibers with silica cladding, typically having a small mode field diameter and a high doping so as to reduce effective beam area and increase non-linear susceptibility. Tapered fibers with air cladding can be used, which can be formed by heating and stretching, microstructured fibers having air or filled holes in a cladding. Holes can be filled with an inert gas or a liquid or other material. Regular arrays of holes can be provided to form highly non-linear photonic crystal fibers (PCFs). Non-silica fibers or other non-silica waveguides can be used, wherein the waveguides are based on one or more of lead silicates, chalcogenides, tellurite oxide, or bismuth oxide. Non-linear waveguides can be defined in planar waveguides such as silica, polymer, or other materials that are situated on a planar or other substrate such as, for example, silicon, quartz, or other insulators or semiconductors. Highly non-linear fibers (HNFs) are commercially available. In some examples, HNFs are germanium-doped silica fibers with low dispersion slopes and small effective mode diameters. Non-linear processes can require phase matching among or between various frequencies, and phase-matching can be based on crystalline orientation, waveguide dispersion, or other approaches. Such non-linear materials and devices are referred to herein as non-linear optical elements (NLEs). In some examples, an NLE is used to produce correlated photons and an NLE is used to provide a deterministic photon as an output. These NLEs can be referred to as, for example, input or output NLEs, primary or secondary NLEs, or first and second NLEs. A single NLE can serve as both an input NLE and an output NLE. Non-linear processes can mix and produce photons having the same or different states of polarization (SOPs), and beams can be separated or combined based on SOP.

The disclosed methods and apparatus can be implemented using discrete or integrated optical components and free space or guided wave optics. For example, optical beams at different wavelengths can be combined or separated using optical-fiber based wavelength multiplexers (referred to as wavelength division multiplexers or WDMs), arrayed waveguide gratings, fiber Bragg gratings, other waveguide devices such as defined in silicon, fused silica, polymers, or other materials, or using dichroic coatings on plate or prism substrates. Passive couplers (beamsplitters) can be used as well, but generally exhibit undesirable additional optical losses. Fiber-based on other waveguide couplers can be used, but beamsplitters that use thin film coatings can be used as well. While wavelength dependent beam combination and separation (splitting) are often convenient, polarization dependent beam combination and splitting can be used as well. For example, polarizing beam splitter cubes having a dichroic polarization dependent coating, Glan- Thompson prisms, Wollaston prisms, calcite beam displacers, and optical fiber polarization beam combiners/splitters can be used to separate photons at the same or different wavelengths based on polarization.

As noted above, in some cases, beams are referred as pump, signal, and idler beams but interacting beams are more simply noted as a first beam, a second beam, a third beam, etc. It will be appreciated that many materials have non-zero values of second and third order non-linear coefficients, but in practical examples, materials having large values of $\chi^{(2)}$ or $\chi^{(3)}$ are preferred. Parametric processes can result from four wave mixing in a $\chi^{(3)}$ non-linearity or three wave mixing in a $\chi^{(2)}$ non-linearity. In one example, wavelength correlated photons are produced by spontaneous parametric down conversion (SPDC), but other non-linear processes can be used.

In the examples below, an electro-optic or other modulator is generally configured to apply a modulation in response detection of one photon of two or more correlated photons based on a wavelength of a detected photon. Phase modulators are generally preferred, but amplitude modulators can also be used.

Correlated photons are processed so no more than one pair (or other set) of correlated photons is generated during a predetermined time interval in a given frequency band. This can be accomplished by pumping a non-linear optical element (referred to generally as an "NLE") with a pump laser beam that is sufficiently powerful that one pair (or other set) of photons is created in a single mode of the possible modes but not more than one pair (or set) of photons is likely to be generated in said single mode. In the production of a single deterministic photon, an initial correlated photon pair is produced so that within a specific time interval, the likelihood of producing two or more correlated photon pairs should be low. This can be accomplished by choosing the pump power such that the average number of pairs generated per frame or pump pulse, $\bar{n}$, is approximately 1, but distributed over N different frequency bins. Then, the probability of multipair generation over all sources is approximately $P(n \geq 2) \approx M(\bar{n}/N)^2 \approx \bar{n}^2/N$ while the probability for generating exactly one pair is $P(n=1) \approx \bar{n}$. By making the number of frequency bins, N, very large, the multipair probability approaches zero even while the single-pair probability stays fixed at unity, thus producing a true deterministic photon source. Optical powers used to produce correlated photon pairs can be adjusted to control such likelihoods. Fixed or variable optical attenuators can be used, but are not shown in the examples. If a first photon is detected in more than one frequency band, then only the primary photon will be frequency shifted to the desired frequency.

In the examples below, bulk optics, guided wave optics such as optical fibers, or combinations thereof can be used. Detectors used in conjunction with the detection of single photons are referred to herein as photon detectors. Examples of such detectors include avalanche photodiodes (APDs) such as Si, Ge, or InGaAs/InP APDs, photomultipliers, and superconductor-based detectors. High quantum efficiency, low-noise, fast recovery, and the ability to discriminate between one or more photons are preferable.

Representative Examples

Figure 1:
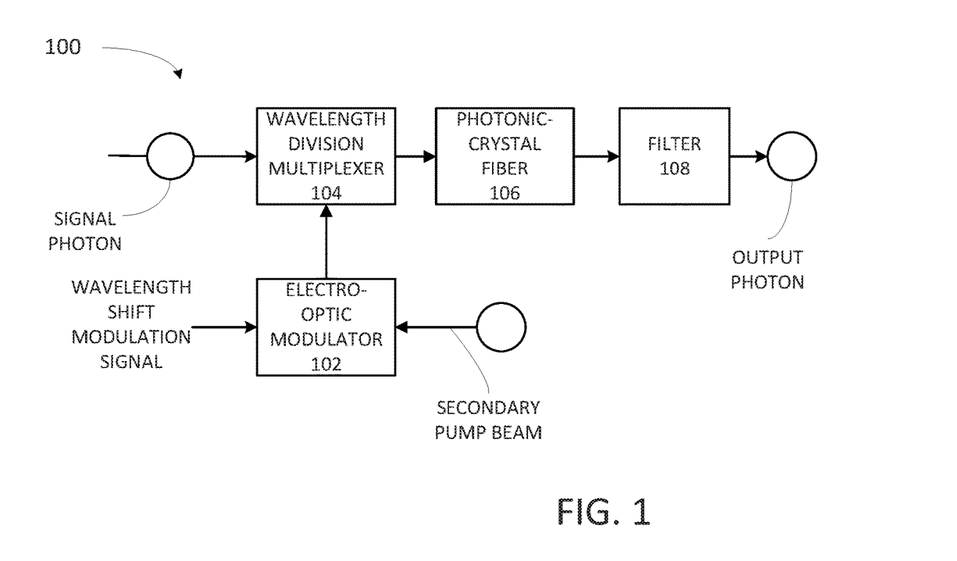
FIG. 1 is a block diagram of an exemplary single photon emitter.

FIG. 1 shows a block diagram of single photon emitter 100 that can produce a heralded, deterministic photon. The single photon emitter includes an electro-optic modulator 102 situated to receive a secondary pump beam, and couple a modulated secondary pump beam to a wavelength division multiplexer (WDM) 104. The WDM 104 is also coupled to receive an input photon (typically a signal photon produced in a non-linear optical process) and couple the modulated secondary pump beam and the signal photon to propagate in a photonic-crystal fiber (PCF) 106. Interaction of the signal photon and the second pump beam in the PCF 106 can produce an output photon having a particular pre-selected (deterministic) wavelength based on the signal photon wavelength, the secondary pump beam wavelength, and the modulation applied by the electro-optic modulator 102. In the example of FIG. 1, the signal photon can be produced using spontaneous parametric down-conversion or other methods. Signal photon wavelength can be determined by measurement of a corresponding idler photon wavelength, given the relationship between pump beam wavelength and signal and idler photon wavelengths discussed above. By applying suitable modulation with the electro-optic modulator 102 and selection of second pump beam wavelength, the output photon is heralded and can have a predetermined wavelength. If desired, differing modulations can be applied by the electro-optic modulator 102 so that each output photon can have the same or a different wavelength. Alternatively, the secondary pump beam wavelength can be modulated to produce output photons having wavelengths that vary based on variations in the secondary pump beam wavelength, or both the secondary pump beam wavelength and the modulation applied by the electro-optic modulator can be varied as preferred. As shown in FIG. 1, the electro-optic modulator 102 modulates the secondary pump beam so that losses in the electro-optic modulator 102 can be compensated with suitable power adjustments of the secondary pump beam. By contrast, previous approaches have directed signal photons to modulators, resulting in unacceptable high probabilities of absorption (i.e., destruction) of the input signal photon, thus spoiling determinism of the single photon source.

In the example of FIG. 1, the PCF 106 permits interaction of the signal photon and the secondary pump beam. Other non-linear materials can be used, and modulators other than electro-optic modulators can be used. For example, MEMS devices, acousto-optic modulators, optical fiber based modulators, waveguide modulators, or others can be used.

The wavelength division multiplexer 104 multiplexes together the signal photon and the modulated pump photon. The output of the multiplexer 104 is directed towards the photonic-crystal fiber 106. In other examples, a device other than a multiplexer can be used to combine the modulated pump photon and the signal photon.

As discussed above, the wavelength of the output photon can be tunable or programmable. In these examples, the electro-optic modulator 102 shifts the wavelength of the pump photon by an amount based on signal photon wavelength (determined by measurement of a wavelength of a related idler photon) and an applied modulation to obtain a selected output photon wavelength. The single photon emitter 100 can also include a filter 108 selected to separate the output photon from the secondary pump beam. The filter 108 can reflect the output photon and transmit the secondary pump beam, or reflect the secondary pump beam and transmit the output photon. The filter 108 can be particularly useful as power in the secondary pump beam can be relatively high. In some applications, an optical-fiber based wavelength division multiplexer can be used. The filter 108 can pass the output photon having the desired wavelength and block other wavelengths. This can ensure that only the output photon is emitted and can filter out any stray photons at other wavelengths.

Figure 2:
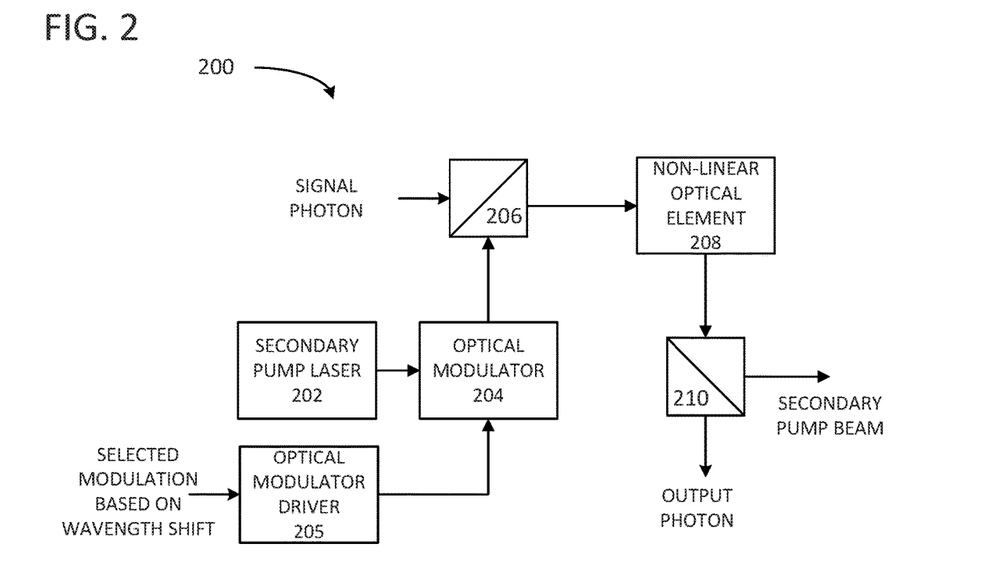
FIG. 2 is a block diagram of another exemplary single photon emitter.

FIG. 2 shows a block diagram of another exemplary single photon emission system 200 that includes a secondary pump laser 202 that couples a secondary pump beam to an optical modulator 204 that applies a modulation to the secondary pump beam with a modulator driver 205 based on a selected wavelength shift to be applied. A dichroic beamsplitter 206 receives the modulated secondary pump beam from the optical modulator 204 and the signal photon, and couples the modulated secondary pump beam and the signal photon to a non-linear optical element 208. Based on a non-linear interaction in the non-linear optical element 208, an output photon is produced at a wavelength associated with the applied modulation and the secondary pump beam wavelength. A dichroic beamsplitter 210 transmits the output photon and reflects the secondary pump beam.

Figure 3:
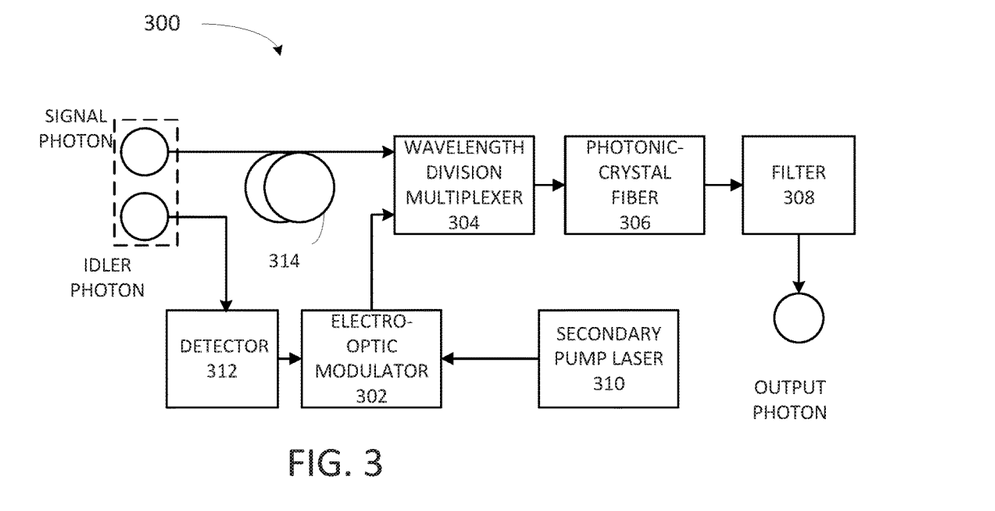
FIG. 3 is a block diagram of another exemplary single photon emitter that includes an optical delay.

Referring to FIG. 3, another exemplary heralded, deterministic photon emitter system 300 includes a WDM 304 situated to receive a signal photon and a secondary pump beam from a secondary pump laser 310 as modulated by an electro-optic or other modulator 302. A detector 312 is situated to receive an idler photon that is correlated with the signal photon. Based on detection of the idler photon, the availability of the signal photon is determined, and in some examples, the detector 312 determines idler photon wavelength as well. The detector 312 is coupled to the electro-optic modulator 302 to provide suitable modulation to the secondary pump beam. In some examples, the detector 312 is coupled to the secondary pump laser 310 to permit selection of second pump beam wavelength. Typically, modulation of the secondary pump beam is simpler and faster using the electro-optic modulator 302 but the secondary pump laser 310 can be tuned. A non-linear element 306 (a PCF fiber in this example) receives the modulated secondary pump beam and the signal photon to produce an output photon at a preferred wavelength. A filter 308 can be used to separate the output photon and the secondary pump beam, as needed. In some cases, an optical delay 314, such as a length of optical fiber, receives the signal photon to permit processing of the idler photon for the determination of the modulation to be applied by the electro-optic modulator 302.

Figure 4:
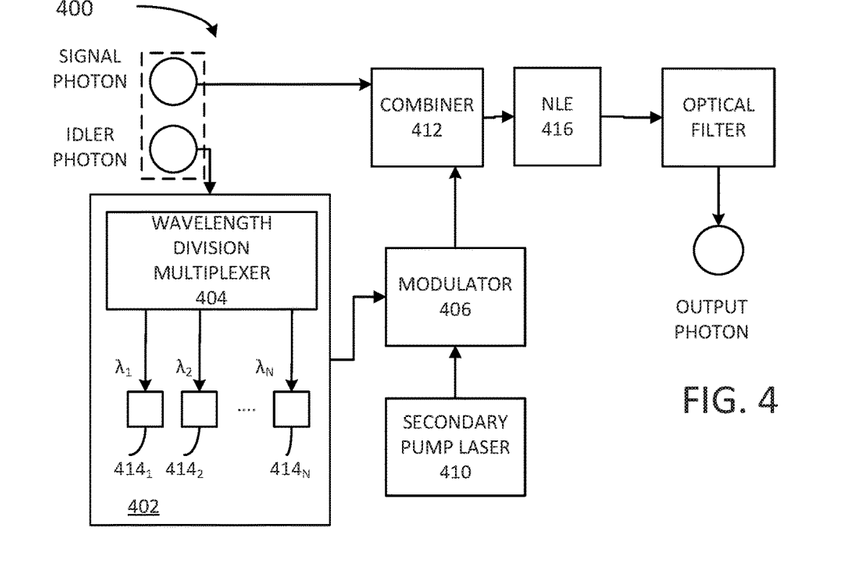
FIG. 4 is a block diagram of another exemplary single photon emitter illustrating a plurality of photon detectors associated with spectral ranges defined by a wavelength division multiplexer.

With reference to FIG. 4, another exemplary single photon emitter 400 includes a photon detector 402 that comprises a spectral disperser 404 such as an optical fiber WDM, a diffraction grating, dispersive prism, dichroic filter, fiber Bragg grating, or other device that spatially separates wavelengths. Each of a plurality of single photon detectors $414_1, \ldots, 414_N$ is situated to detect the idler photons at wavelength or wavelength ranges $\lambda_1, \ldots, \lambda_N$, respectively, established by the spectral disperser 404. The photon detector 402 is coupled to an optical modulator 406 that receives a secondary pump beam from a secondary pump laser 410, and applies a modulation to the secondary pump beam based on the detected wavelength of an idler photon. A beam combiner 412 receives a signal photon associated with the detected idler photon and combines the signal photon with the modulated secondary pump beam and directs the combination to a non-linear optical element 416. The non-linear optical element 416 produces an output photon in response to the signal photon and the modulated secondary pump beam. In some examples, the output photon wavelength corresponds to a sum or difference frequency. The photon detector both determines the availability of a signal photon (i.e., heralds a signal photon) and the signal photon wavelength based on the measured idler wavelength. Thus, the output photon is a deterministic photon.

Figure 5:
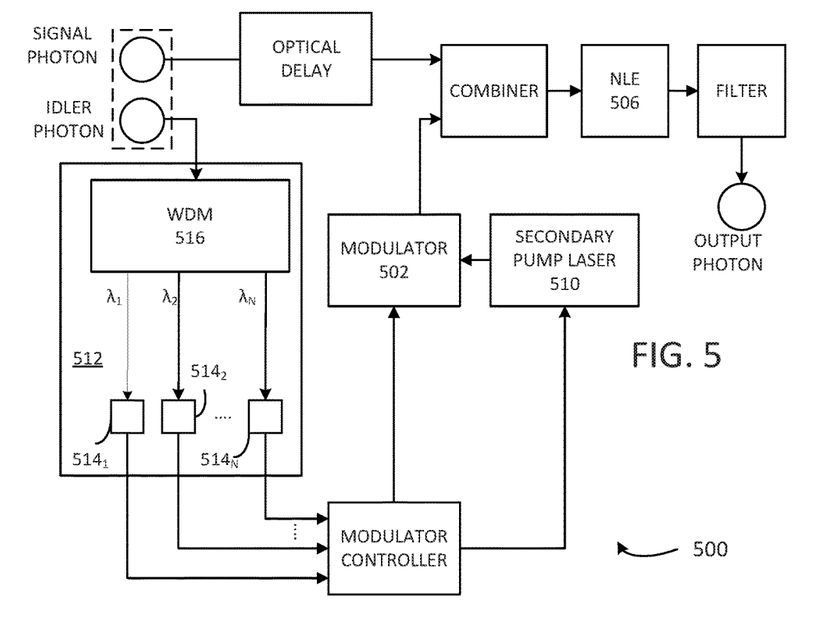
FIG. 5 is a block diagram of another exemplary single photon emitter.

In the example of FIG. 5, each of the single photon detectors $514_1, \ldots, 514_N$ can detect an individual photon. The wavelength division multiplexer 516 receives the idler photons as an input and divides the input idler photons into distinct spectral bands. Then, the idler photons corresponding to each spectral band are sent to a different single photon detector 514. The number of single photon detectors can be the same as the number of possible wavelengths of the idler photon. Thus, dividing the received idler photons into different spectral bands can exactly determine the wavelength of a received photon, since there is only one possible wavelength for an idler photon within a given spectral band. As such, each single photon detector can detect an idler photon having a particular wavelength. When an idler photon is detected by a particular single photon detector, the detected idler photon heralds the presence of a corresponding signal photon that will have a known wavelength corresponding to the wavelength of the detected idler photon. The photon detector 512 can then send a signal to the electro-optic modulator 502 indicating how much to modulate the wavelength of the pump laser 510 based on which single photon detector detected an idler photon. This ensures that the modulator 502 modulates the output of the pump laser 510 the correct amount to cause the NLE 506 to output a photon at the desired wavelength.

Figure 6:
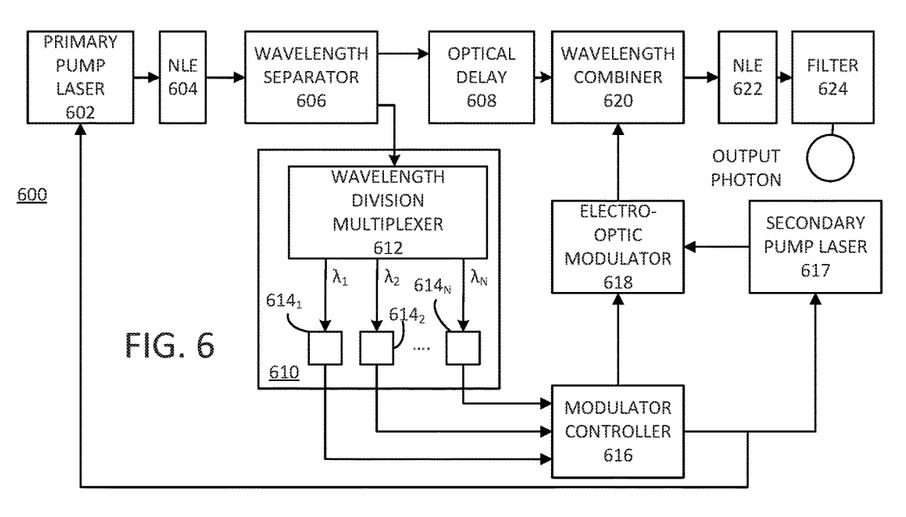
FIG. 6 is a block diagram of another exemplary single photon emitter.

FIG. 6 shows a block diagram of another exemplary single photon emitter 600 that includes a primary pump laser 602 that directs a primary pump beam to a non-linear element 604 that produces a correlated photon pair (or other group of correlated photons). A wavelength separator 606 directs a signal photon to an optical delay 608 and an idler photon to a detector 610 that includes a WDM 612 (or other wavelength separator). Detectors $614_1, \ldots, 614_N$ are each situated to detect idler photons at respective wavelengths or wavelength ranges $\lambda_1, \ldots, \lambda_N$. Upon determination of idler photon wavelength, a modulator controller 616 applies a suitable modulation to a secondary pump beam from a secondary pump laser 617 with an optical modulator 618. The modulation can be selected to produce an output photon at a preferred wavelength based on consideration of the modulation applied by the optical modulator 618 and a wavelength of the secondary pump laser 617. The modulated secondary pump beam typically has a wavelength associated with an output frequency of the secondary pump laser 617 $f_{pump2}$ and the applied modulation $f_m$ such as $f_{pump2} \pm kf_m$, wherein k is a positive integer. A wavelength combiner 620 receives the signal photon and the modulated secondary pump beam and directs both to a non-linear optical element 622. An output photon is produced as a sum or difference frequency of the secondary pump beam and the signal photon; a filter 624 can direct the secondary pump beam to a beam dump or otherwise separate the secondary pump beam and the output photon. Output photon wavelength can also be selected or tuned by varying the wavelength of the secondary pump beam, in some cases, based on the detected idler wavelength. However, the secondary pump beam wavelength is generally tunable as preferred, and need not be tuned based on idler wavelength. If sufficiently fast tuning is possible, the secondary pump beam can be tuned to provide a selected output wavelength.

Figure 7:
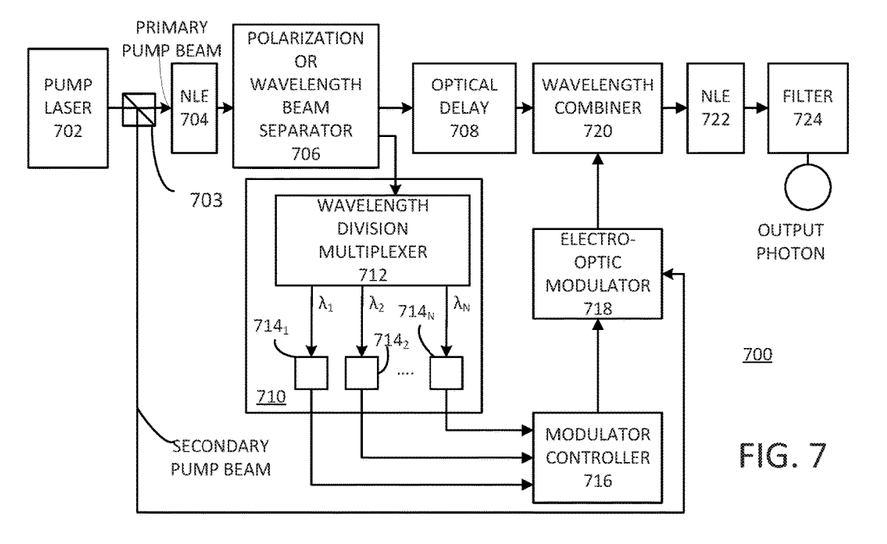
FIG. 7 is a block diagram of another exemplary single photon emitter in which a single pump laser provides primary and secondary pump beams.

With reference to FIG. 7, an apparatus 700 includes a pump laser 702 that delivers a laser beam to a beamsplitter 703 that produces a primary pump beam that is directed to an NLE 704 to produce at least first and second correlated photons. A beam separator 706 couples a first correlated photon to a wavelength sensitive beam divider 712 such as a waveguide WDM so that selected wavelengths are delivered to corresponding detectors $714_1, \ldots, 714_N$. The beam separator 706 can be wavelength or polarization dependent, and in some examples, the first and second correlated photons are at the same wavelength and polarization-based separation is preferred. Upon determination of first photon wavelength, a modulator controller 716 provides a suitable modulation to an optical modulator 718 and a second pump beam from the pump laser 702 is modulated. The modulated secondary pump beam and the second correlated photon (potentially via an optical delay 708) are coupled to a beam combiner 720 and to an NLE 722. A filter 724 is situated to separate an output photon from the pump beam(s).

Figure 8:
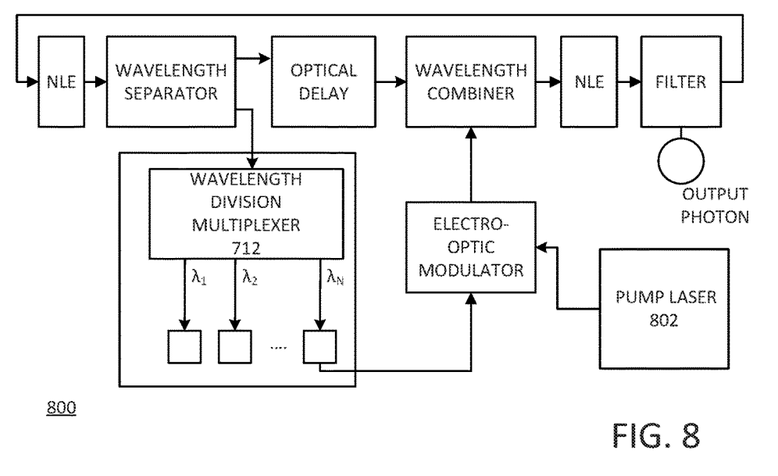
FIG. 8 is a block diagram of another exemplary single photon emitter.

FIG. 8 illustrates a system 800 similar to that of FIG. 7 using a single laser 802 for both a primary pump beam and a secondary pump beam. In this example, the laser beam from the laser 802 is coupled directly to a modulator and then portions thereof are routed to serve as primary and secondary pump beams.

Figure 9:
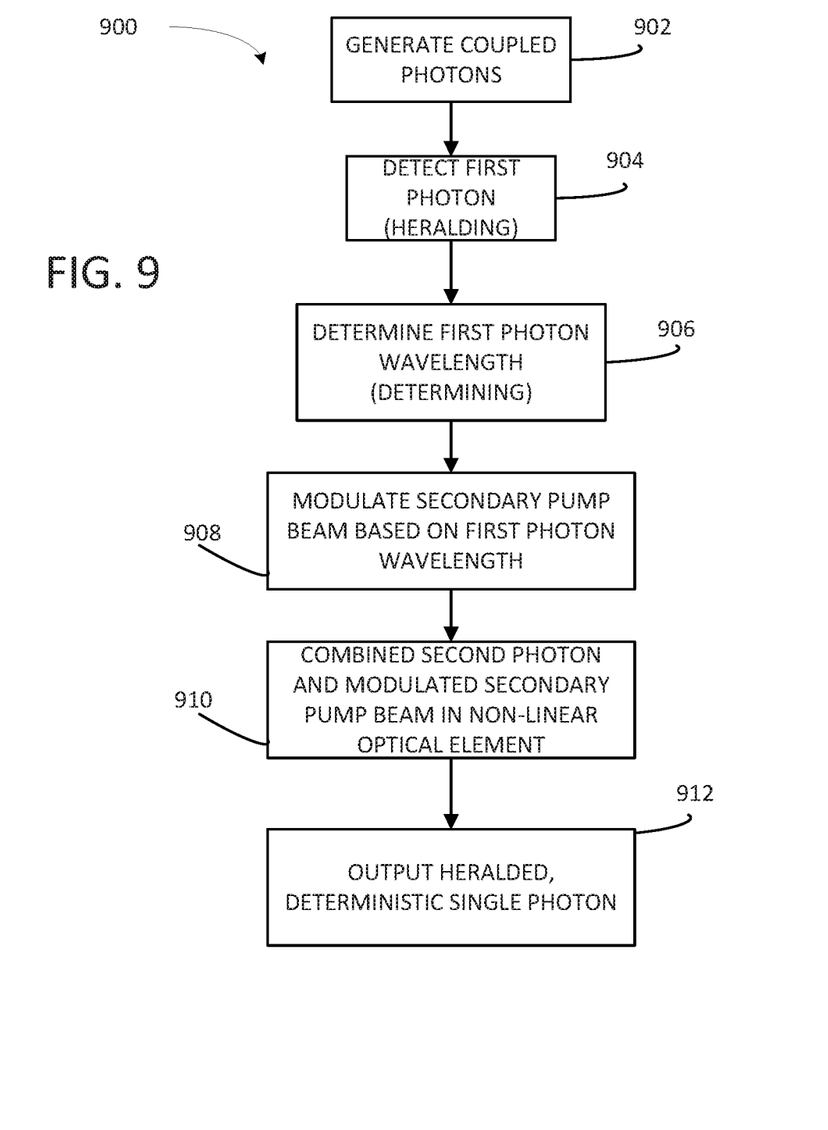
FIG. 9 illustrates a method of producing a deterministic, heralded single photon.

Referring to FIG. 9, a method 900 includes generating correlated photons at 902 and detecting a selected photon of the correlated photons at 904. A wavelength associated with the detected photon is measured at 906 (generally in combination with detection) to establish a modulation to be applied to a secondary pump beam at 908. At 910, the modulated secondary pump beam and another of the correlated photons are combined in a non-linear optical element to produce a photon having a selected wavelength for output at 912. Secondary pump laser wavelength and the applied modulation are selected to produce an output photon at a preferred wavelength after non-linear coupling in the non-linear optical element. This output photon can be referred to as a deterministic photon.

Figure 10:
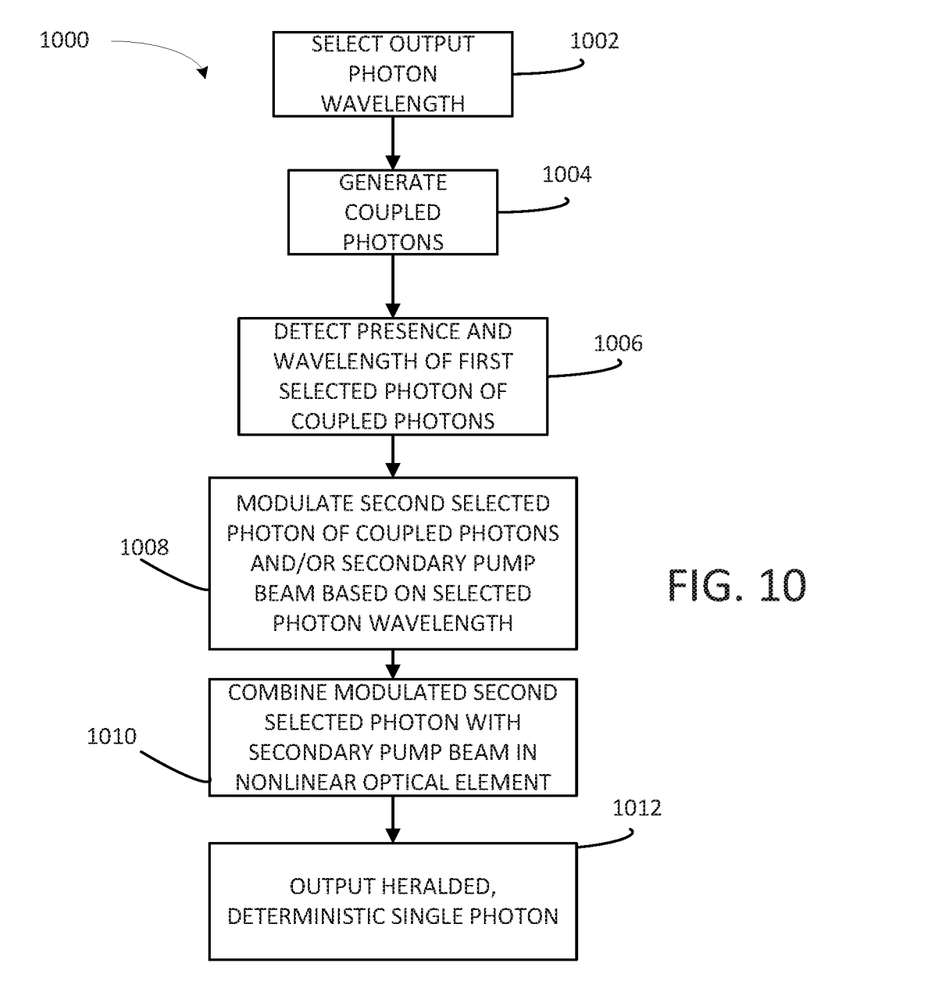
FIG. 10 illustrates another representative method of producing a deterministic single photon.

In another method illustrated in FIG. 10, an output photon wavelength is selected at 1002, and correlated photons (referred to in this example as first and second photons, but there can be more than two correlated photons) are generated at 1004. The availability and wavelength of the first photon is detected at 1006. At 1008, one or both of the second photon and a secondary pump beam are modulated based on the wavelength of the first photon and the selected output photon wavelength. The modulated second photon and the secondary pump beam are combined in a non-linear optical element at 1010, and in response to the non-linear interaction, a deterministic photon is output at 1012.

Figure 11:
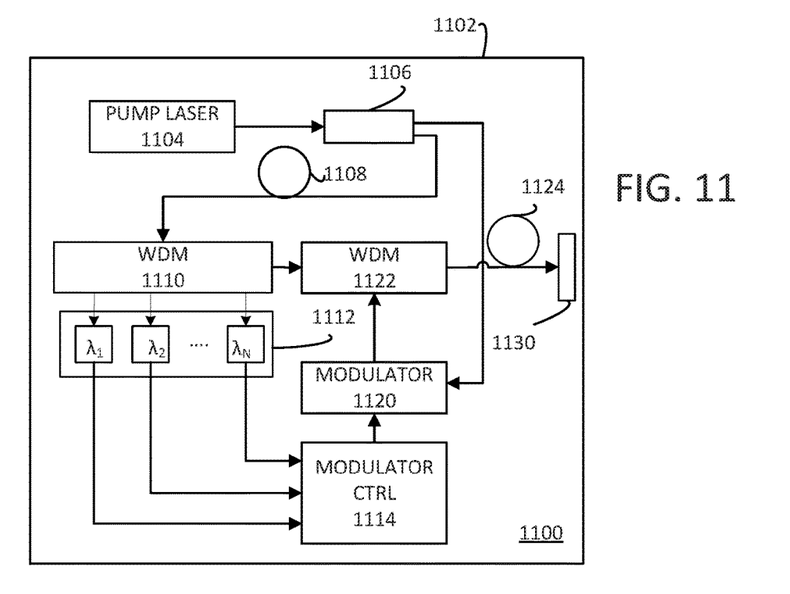
FIG. 11 illustrates an integrated single photon emitter.

With reference to FIG. 11, a photon emitter 1100 is defined on a waveguide substrate 1102 such as silicon, silicon nitride, silica, a III-V semiconductor, a combination thereof, or other substrate. The photon emitter 1100 is thus integrated into a single device. A pump laser 1104 couples a pump beam to a waveguide power splitter 1106 and a portion of the pump beam is directed to a non-linear waveguide 1108 that produces at least first and second correlated photons. A WDM 1110 directs a first of the correlated photons to a wavelength-sensitive detector 1112 and couples an output signal to a modulator control 1114 to establish a suitable modulation to apply to a secondary pump beam to produce an output photon at a preferred wavelength. A modulator 1120 is coupled to the waveguide power splitter 1106 to receive a portion of the pump beam and couple the modulated portion to a WDM 1122. The WDM 1122 also receives the second photon of the correlated photons and directs the modulated portion of the pump beam and the second photon to a non-linear waveguide 1124 to produce an output photon at the selected frequency. A filter 1130 is situated to couple the output photon for use, while blocking or attenuating other beams such as the modulated pump beam.

Figure 12:
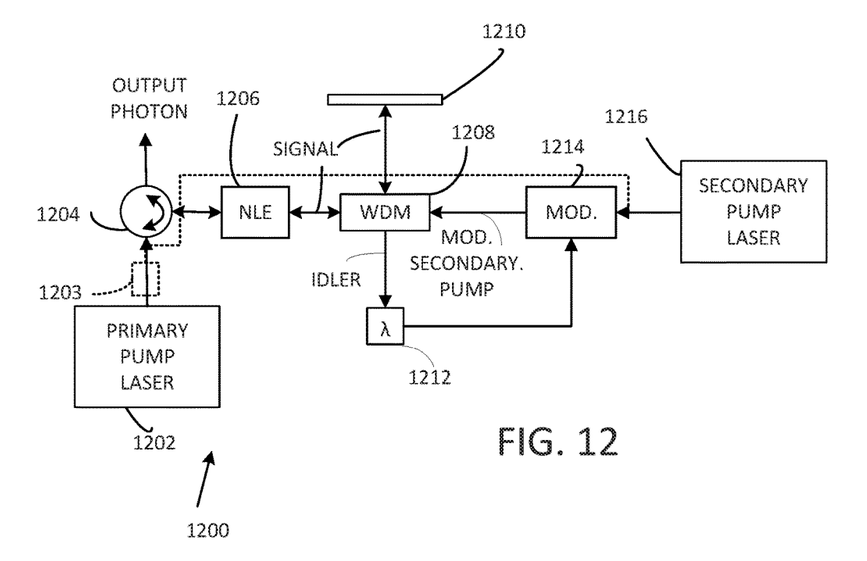
FIG. 12 illustrates a representative single photon emitter that uses a single non-linear optical element (NLE).

With reference to FIG. 12, a single photon emitter 1200 includes a primary pump laser 1202 that couples a primary pump beam to an optical circulator 1204. An NLE 1206 receives the primary pump beam from the optical circulator 1204 and produces first (signal) and second (idler) correlated photons that are output to a WDM 1208 or other wavelength-based beam separator. The idler photon is coupled to a wavelength sensitive detector 1212 that is coupled to an optical modulator 1214 that produces a modulation associated with an intended output photon wavelength. A secondary pump laser 1216 couples a secondary pump beam to the optical modulator 1214 so that a modulated secondary pump beam is coupled to the WDM 1208. The WDM 1208 also directs the signal photon to a reflector 1210 that returns the signal photon to the WDM 1208. As a result, the modulated secondary pump beam and the signal photon are input to the NLE 1206 that produces an output photon that can be coupled out of the single photon emitter 1200 by the optical circulator 1204. In this example, a single NLE is used to produce the output photon and the correlated photons, and the associated optical beams are shown as counter-propagating in the NLE 1206. In other arrangements, such beams can co-propagate. FIG. 12 also shows that a power splitter 1203 can be situated to direct a portion of the primary pump beam to the modulator 1214, so that the secondary pump laser 1216 is not needed.

Figure 13:
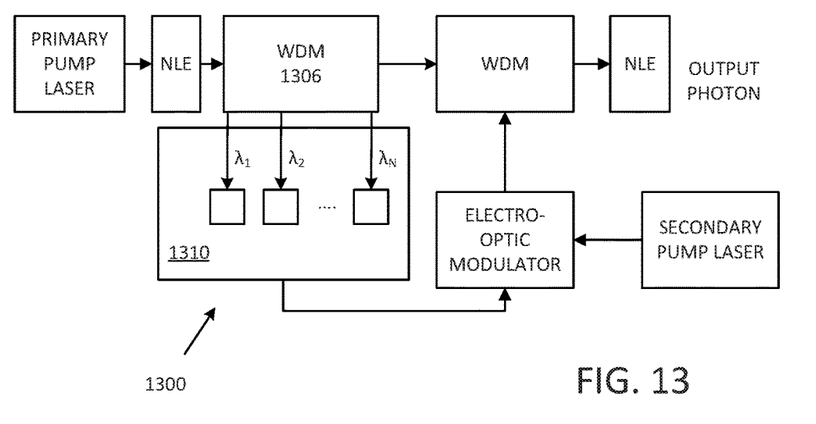
FIG. 13 illustrates a representative single photon emitter in which a wavelength division multiplexer (WDM) separates correlated photons, and directs one of the correlated photons to a photon detector of a plurality of photon detectors based on a wavelength of the photon.

In another example shown in FIG. 13, a WDM 1306 is situated to receive correlated photons and associate each of a plurality of photon detectors with a respective wavelength range.

Figure 14:
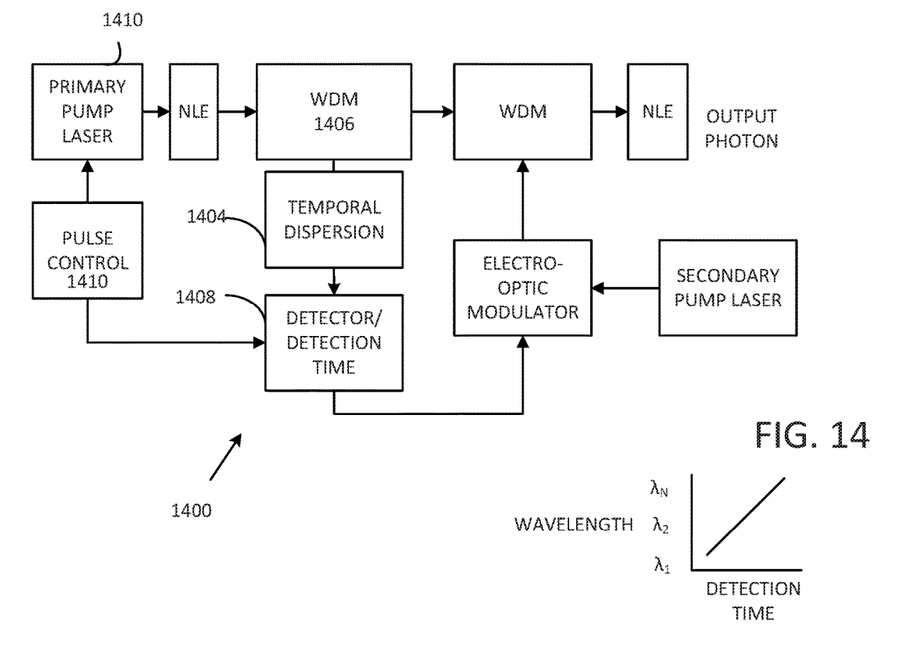
FIG. 14 illustrates a system that determines a wavelength of a selected photon of a pair of correlated photons based on a temporal delay associated with wavelength.

Referring to FIG. 14, a deterministic single photon emitter 1400 includes a spectrally variable temporal disperser 1404 such as a length of optical fiber that is coupled to a WDM 1406 to deliver a temporally delayed photon such as a signal or idler photon to a detector 1408. The temporal delay can be related to photon wavelength as shown in FIG. 14. Such delay can be established based on timing of pump beam pulses from a primary pump laser 1410. Pump pulse timing can be detected by optical detection of pump pulses, or based on a pulse control signal from a pulse controller 1410.

In view of the many possible embodiments to which the principles of the disclosed technology may be applied, it should be recognized that the illustrated embodiments are only preferred examples of the disclosed technology and should not be taken as limiting the scope of the disclosed technology. Rather, the scope of the disclosure is at least as broad as the following claims. We therefore claim all that comes within the scope of these claims.

We claim:

1. An apparatus comprising:
 a secondary laser configured to produce a secondary pump beam;
 a modulator situated to receive the secondary pump beam and modulate the secondary pump beam at a frequency based on a wavelength of a first photon of a pair of correlated photons;
 a beam combiner situated to combine a second photon of the pair of correlated photons and the modulated secondary pump beam;
 a secondary non-linear optical element (NLE) configured to receive the second photon of the pair of correlated photons and the modulated secondary pump beam from the beam combiner and produce an output photon having a wavelength based on wavelengths of the second photon and the modulated secondary pump beam; and a beam separator situated to receive the pair of correlated photons and direct the second photon to the secondary NLE and the first photon to a detector so as to determine the wavelength of the second photon, wherein the beam separator provides a plurality of beam separator outputs, each associated with a respective wavelength range.

2. The apparatus of claim 1, further comprising an optical filter situated to separate the output photon from the modulated secondary pump beam.

3. The apparatus of claim 1, further comprising a primary pump laser configured to produce a primary pump beam, wherein the pair of correlated photons is produced in response to the primary pump beam.

4. The apparatus of claim 3, further comprising a primary non-linear optical element (NLE) situated to receive the primary pump beam and produce the pair of correlated photons.

5. The apparatus of claim 1, wherein the detector includes a spectral disperser and a plurality of photon detectors, wherein each of the photon detectors is coupled to the spectral disperser so as to be associated with a respective wavelength range so that the wavelength of the first photon of the pair of correlated photons is determined based on detection by a selected photon detector of the plurality of photon detectors.

6. The apparatus of claim 1, wherein the detector comprises a plurality of photon detectors, wherein each of the photon detectors is coupled to the beam separator so as to be associated with a respective wavelength range so that the wavelength of the first photon of the pair of correlated photons is determined based on detection by a selected photon detector of the plurality of photon detectors.

7. The apparatus of claim 1, wherein at least one of the beam separator and the beam combiner is a wavelength division multiplexer, a dichroic beamsplitter, or a polarizing beam splitter.

8. The apparatus of claim 1, further comprising a modulator controller coupled to the detector and responsive to detection of the first photon to control the modulation applied by the modulator in response to the wavelength of the first photon.

9. A method comprising:
receiving a first photon and a second photon, wherein the second photon is correlated to the first photon; and
measuring a wavelength of the second photon and applying a modulation to a secondary pump beam based on the measured wavelength to produce an output photon;
wherein the wavelength of the second photon is measured by directing the second photon to a spectral disperser that applies a spatial dispersion, and detecting the second photon as received from the spectral disperser.

10. The method of claim 9, wherein the output photon is produced by combining the first photon and the modulated secondary pump beam in a first non-linear optical element.

11. The method of claim 10, wherein the first photon and the modulated secondary pump beam are combined with a wavelength division multiplexer and then directed to the first non-linear optical element.

12. The method of claim 10, further comprising filtering an output beam produced by the first non-linear optical element to selectively attenuate output beam portions at wavelengths outside of a wavelength range associated with the output photon.

13. The method of claim 9, wherein the second photon is detected by one of a plurality of photon detectors situated with respect to the spectral disperser so as to be associated with respective spectral ranges, so that detection of the second photon by one photon detector of the plurality of photon detectors indicates that the second photon wavelength is in the associated spectral range.

14. The method of claim 9, further comprising producing the correlated photons by directing a primary pump beam to a second non-linear optical element.

15. The method of claim 14, wherein at least one of the first non-linear optical element and the second non-linear optical element is a photonic crystal fiber.

16. A deterministic photon source, comprising:
a primary laser that produces a primary pump beam;
first photonic crystal fiber situated to receive the primary pump beam and produce a series of correlated photon pairs;
a first wavelength division multiplexer (WDM) and a second WDM, wherein the first WDM receives the correlated photon pairs and directs a first photon of each correlated photon pair to the second WDM;
a plurality of photon detectors coupled to a third WDM to receive the second photon of each correlated photon pair, wherein the photon detectors are situated so that each photon detector is associated with a respective wavelength range;
a secondary pump laser that produces a secondary pump beam;
a phase modulator coupled to the plurality of photon detectors and configured to apply a phase modulation to the secondary pump beam in response to detection of a particular second photon at a particular photon detector, wherein the phase modulation is associated with the wavelength range associated with the particular detector; and
a second photonic crystal fiber situated to receive each of the first photons and the modulated secondary pump beam from the second WDM, and produce output photons at a wavelength based on the modulated secondary pump beam wavelength and the wavelength of the first photon.

* * * * *